United States Patent [19]

Chernak

[11] 4,037,817
[45] July 26, 1977

[54] PINCH TUBE VALVE

[75] Inventor: John A. Chernak, BedfordHeights, Ohio

[73] Assignee: Tomlinson Industries, Inc., Cleveland, Ohio

[21] Appl. No.: 626,493

[22] Filed: Oct. 28, 1975

[51] Int. Cl.$^2$ .............................................. F16K 7/06
[52] U.S. Cl. ........................................ 251/7; 137/801
[58] Field of Search .................. 222/527, 529; 251/4, 251/6–10; 239/546, 602; 137/801

[56] References Cited

U.S. PATENT DOCUMENTS

| 1,855,323 | 4/1932 | Sirch | 251/8 X |
| 2,549,207 | 4/1951 | Kestenbaum | 251/7 X |
| 2,615,668 | 10/1952 | Ernest | 251/7 |
| 2,863,451 | 12/1958 | Barr et al. | 251/7 X |

FOREIGN PATENT DOCUMENTS

| 1,317,101 | 12/1962 | France | 251/7 |

*Primary Examiner*—Martin P. Schwadron
*Assistant Examiner*—Richard Gerard
*Attorney, Agent, or Firm*—Fay & Sharpe

[57] ABSTRACT

A pinch tube type valve adapted to accept an elongated flexible outlet tube protruding from a liquid container for selective control of liquid flow through the tube from the container. The tube is passed through a passageway in the valve body for selective engagement by a stem which is reciprocable into and out of closing engagement therewith. An apertured tube receiving area is disposed in the bottom wall of the valve body adjacent the outlet end of the passageway to receive the tube in a desired position angularly disposed of the passageway to facilitate ease of liquid dispensing operations. A stop or tube retention member is removably received in the passageway at the outlet end thereof to retain the tube in its desired position within the receiving area.

13 Claims, 6 Drawing Figures

U.S. Patent  July 26, 1977  4,037,817
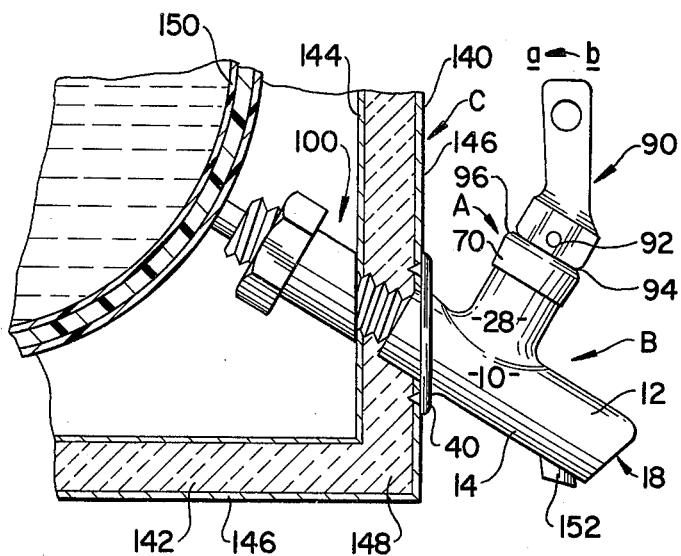
FIG. 1
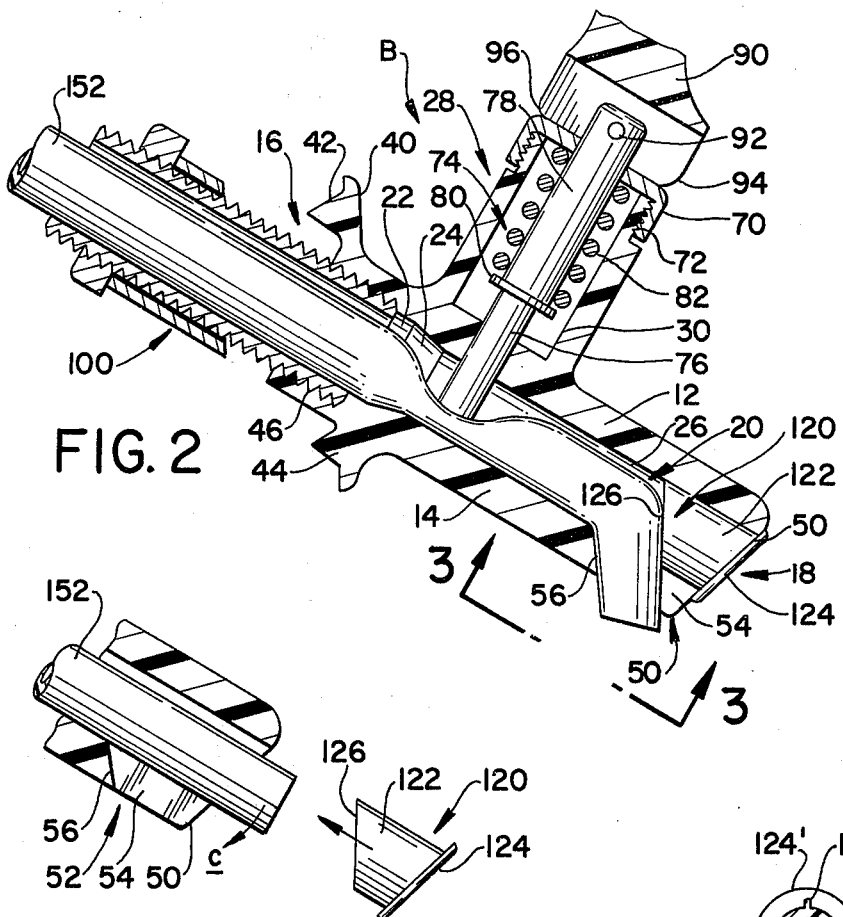
FIG. 2
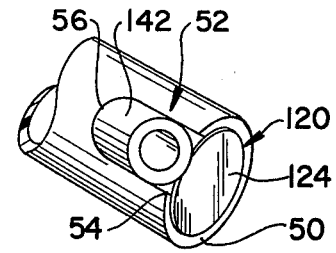
FIG. 3
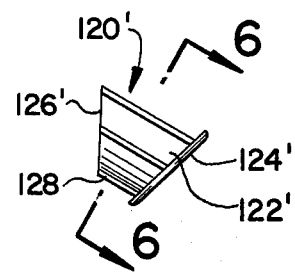
FIG. 4
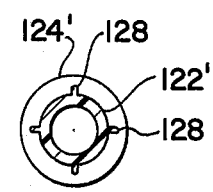
FIG. 5
FIG. 6

PINCH TUBE VALVE

BACKGROUND OF THE INVENTION

This invention pertains to the art of values and more particularly to pinch tube type valves or faucets.

The invention is particularly applicable to dispensing liqids from containers having an elongated flexible outlet tube disposed at the bottom end thereof and will be described with particular reference thereto; however, it will be appreciated by those skilled in the art that the invention has broader applications and is equally applicable to any number of other liquid dispensing environments.

Nonessential subject matter from the commonly assigned patent application Ser. No. 508,208 filed Sept. 23, 1974 now U.S. Pat No. 3,976,277 is incorporated hereinto by reference.

The subject pinch tube valve comprises a variation of the valve disclosed and claimed in the commonly assigned application and is equally applicable to those environments and uses as the valve disclosed therein. The subject new valve, however, provides a structure which is deemed to be particularly beneficial from manufacturing and use standpoints.

In using the concepts of the subject invention, a certain amount of machining or mold costs may be eliminated and convenient means are provided to differentiate between a plurality of identical valves which are used in dispensing different liquids. In the copending and commonly assigned patent application, an aperture having a key-like configuration is provided to both receive and retain a pinch tube in a desired angular disposition relative to the valve passageway. The key-like aperture is comprised of a slot-like portion extending inwardly along the bottom surface of the valve body from the outlet end of the passageway and opening into a tube retaining portion disposed at the innermost end of the slot-like portion. The slot-like portion has a width less than the cross-sectional dimension. of the tube and the tube retaining portion has a cross-sectional dimension greater than the width of the slot-like portion.

Accordingly, when the valve body is constructed from steel, brass or the like, this area is necessarily machined into the valve body and as such, requires separate and distinct machining operations in order to achieve the precise physical dimensions of the apertured area. Likewise, when the valve is molded from plastic, the mold itself necessarily requires more intricate features in order that the precise physical dimensions of the apertured area would be included in the final molded valve body. Although the pinch tube valve described and claimed in the commonly assigned application Ser. No. 508,208 proves entirely satisfactory in use, the inclusion of the multi-dimensioned tube retaining aperture adds undesired production costs to the final valve assembly.

In addition, it has been found that it is oftentimes desirable to provide a number of liquid containers, each with their own pinch tube valve, disposed in the closely spaced relationship with each other whereby a number of different types of liquid may be dispensed as may be desired and/or required. By way of example only, in a restaurant type environment where wine is dispensed from containers by the "glass" through use of pinch tube valves, it has been found desirable to include a number and variety of wines in separate containers in order that customers may have a wider selection of wines dispensed by that method. In this as well as other situations, it has become desirable to provide easy and convenient means for identifying the liquid included within each container in order that it may be appropriately dispensed when desired. Heretofore in this situaion, mistakes as to the proper or desired liquid to be dispensed have caused difficulty resulting in dissatisfied customers, loss of liquid and in some liquid dispensing environments, damage to equipment, machinery or the like.

BRIEF DESCRIPTION OF THE PRESENT INVENTION

The present invention contemplates a new and improved article which overcomes all of the above referred to problems and others and provides a new and improved pinch tube type valve which is simple in design, economical to manufacture, readily adaptable to use in a wide range of liquid dispensing environments and readily adaptable to use in environments where a number of different but closely associated liquids are to be dispensed through substantially identical valves from a plurality of liquid containers.

In accordance with the present invention, there is provided an improvement in pinch tube type valves for use in selectively controlling liquid flow through a flexible tube. This general type of valve includes a valve body having an inlet end, and outlet end, a passageway connecting the inlet and outlet ends, an upper surface and a lower surface wherein the flexible tube is adapted to be passed through the passageway with the outermost end thereof disposed adjacent the valve body outlet end. Accordingly, the improvement comprises tube receiving means disposed in the lower surface of the valve body adjacent the outlet end for receiving the outermost end of the tube in a particular desired position for dispensing liquid therefrom. In addition, a stop or tube retention member is provided to be selectively receivable in the passageway at the outlet end and which member includes a shank portion adapted to extend through a portion of the passageway from the outlet end.

In accordance with another aspect of the present invention, the stop or tube retention member shank includes an end face which is adapted to engage the pinch tube when the outermost end of the tube is positioned to extend through the tube receiving means which comprises an apertured area.

In accordance with still another aspect of the present invention, the aperture and shank are dimensioned such that the distance between the end wall of the aperture which is spaced toward the inlet end of the valve body and the stop or tube retention member end face is approximately equal to the outside diameter of the tube.

In accordance with still another aspect of the present invention, the end wall of the aperture which is spaced toward the inlet end of the valve body and the stop or tube retention member end face are generally parallel to each other.

In accordance with yet another aspect of the present invention, there is provided a new pinch tube type valve structure adapted to receive an elongated flexible tube for selective control of liquid through the tube and which incorporates the improved features described above.

The principle object of the present invention is the provision of a new and improved pinch tube type valve which improves liquid dispensing operations through a pinch tube associated with the valve.

Another object of the present invention is the provision of a new and improved pinch tube type valve which is simple in design.

Another object of the present invention is the provision of a new and improved pinch tube type valve which facilitates accurate guiding for a stream of liquid issuing from a pinch tube associated with the valve.

Still another object of the present invention is the provision of a new and improved pinch tube type valve which facilitates ease of identification of the precise liquid being dispensed through the valve.

Yet, a further object of the present invention is the provision of a new and improved pinch tube type valve which is readily adaptable for use in any number of liquid dispensing environments.

BRIEF DESCRIPTION OF THE FIGURES

The invention may take physical form in certain parts and arrangements of parts, a preferred embodiment of which will be described in detail in the specification and illustrated in the accompanying drawings which form a part hereof and wherein:

FIG. 1 is a side view of the subject new and improved pinch tube type valve shown in typical contemplated liquid dispensing environment;

FIG. 2 is a longitudinal cross-sectional view of the valve shown in FIG. 1;

FIG. 3 is a view taken along lines 3—3 in FIG. 2;

FIG. 4 is a longitudinal cross-sectional view of the outlet end of the valve body with the stop or tube retention member removed and with the pinch tube shown in its initial threaded condition through the valve body;

FIG. 5 is an alternative embodiment of the stop or tube retention member; and,

FIG. 6 is a view taken along lines 6—6 in FIG. 5.

DESCRIPTION OF THE PREFERRED EMBODIMENT

Referring now to the drawings wherein the showings are for purposes of illustrating the preferred embodiment of the invention only, and not for purposes of limiting same, the FIGURES show the subject pinch tube valve as having a body portion A and a valve operating portion B with the valve itself being mounted, for example, in operative association with a liquid chiller structure C. Again, non-essential subject matter from the commonly assigned patent application Ser No. 508,208, filed Sept. 23, 1974, is incorporated hereinto by reference.

More specifically and with reference to FIGS. 1 and 2, body portion A is comprised of a value body 10 having an upper surface 12, a lower surface 14, an inlet end 16 and an outlet end 18. Inlet and outlet ends 16, 18 are interconnected by first passageway 20. This passageway has a first portion 22 extending inwardly from inlet end 16 and merging, through merger zone 24, into a second portion 26. The first portion has a greater cross-sectional dimension than the second portion and the second portion has a slightly greater diameter than the pinch tubes to be associated therewith. This arrangement provides for ease in threading the tubes through the faucet body.

Valve operation portion B includes an operating portion housing 28 having a second passageway 30 passing therethrough and intersecting the first passageway. It should be particularly noted that in the preferred embodiment of the present invention, the second passageway is positioned generally normal to the first passageway. In addition, it should be also noted that the second passageway intersects second portion 26, that is, the smaller cross-sectional portion of first passageway 20.

Disposed adjacent inlet end 16 is a mounting and locating flange 40. In both FIGS. 1 and 2, this flange is disposed at an angle to the longitudinal axis of the first passageway to facilitate angular mounting of the valve which, in turn, facilitates ease of fuid flow by means of gravity through a pinch tube disposed in the first passageway. It should be appreciated further, however, that any number of mounting angles could be employed and that it is also possible to have the mounting flange disposed in a plane generally normal to the longitudinal axis of the first passageway. Extending outwardly from the rear side of flange 40 are a pair of sharp mounting protrusions 42,44 which engage a mounting surface to prevent rotation of the valve once it has been closely installed on such a surface. These protrusions are forced directly into the mounting surface as may be observed from the showings of FIG. 1. Extending inwardly along first portion 22 of first passsageway 20 from inlet end 16 are internal threads 46. These threads are employed in receiving valve mounting and retaining mens which will be described in greater detail hereinbelow For astheitc purposes in hiding the pinch tube from view as well as providing access to the tube for final location once it has been threaded first passageway 20, front face 50 of outlet end 18 on the valve body is preferably angled relative to the longitudinal axis of the first passageway. Here, again, any angle may be satisfactorily utilized and if desired, face 50 may be generally normal to the passageway. This latter described angulation may even be preferred when a stop or tube retention means to be described hereinafter if particularly employed for valve identification and differentiation purposes.

Disposed in lower surface 14, extending from outlet end 18 toward inlet end 16 and communicating with passageway 20 is an apertured tube receiving means generally designated 52. As best shown in FIGS. 2, 3 and 4, this means is comprised of an elongated slot-like aperture 54 having an arcuate innermost end wall 56. Although the arcuate configuration of wall 56 as shown in the FIGURES could take other configurations without departing from the intent and scope of the present invention, the arcuate configuration is preferred in order to prevent undesired kinking or other sharp bending in the pinch tube itself which might undesirably affect liquid flow through the tube. It is generally contemplated in the preferred embodiment of the invention that the width of aperture 54 will be approximtely equal to or just slightly larger than those pinch tubes which are to be operatively associated with the valve. In FIG. 2, it may be seen that innermost end wall 56 of aperture 54 is angled through surface 14 toward inlet end 16 such that it is disposed at approximately the same angle as mounting and locating flange 40 relative to the longitudinal axis of passageway 20. The reasons for this arrangement will become readily apparent hereinafter in the description of opertion of the valve.

Valve body 10 may be constructed from any convenient material as, for example, steel, brass or plastic and in any convenient manner as, for example, by machining, casting or molding. Since the valve structure itself is not directly subjected to liquid pressures and merely acts as a housing for a pinch tube as well as means for selectively opening and closing the pinch tube to control liquid flow therefrom, it need not be constructed of a material having particularly high phisical strength characteristics. For this reason, a molded plastic construction is presently preferred since it adds to reducing the cost of producing the valve.

A bonnet 70 is threadedly received on the outermost end of operating portion housing 28 as at threads 72. An elongated stem member 74 is received in second passageway 30 and includes a pinch tube closing end 76 and an actuating end 78 separated by radially outwardly extending flange 80. End 76 is selectively extensible into and out of first passageway 20 and end 78 extends outwardly of housing 28 through bonnet 70 which, in turn, acts as a guide for the stem. A coil spring 82 is received over end 78 and retained in a state of compression between flange 80 and the inside of bonnet 70 for purposes of exerting a continuous biasing force against flange 80 to urge the stem into the first passageway, and against the pinch tube.

Disposed adjacent bonnet 70 is a valve actuating handle generally designated 90. This handle and stem 74 are interconnected at a pivot mounting 92 to permit relative rockable rotation therebetween. Actuating handle 90 is arcuately movable or rockable about pivot mounting 92 in either of the directions a or b as shown in FIG. 1 and movement in either direction causes movement about one of cam surfaces 94, 96 to withdraw the stem from its full insertion into the first passageway back into the second passageway toward a second or opened position where the stem is substantially withdrawn from first passageway. The specifics of the valve stem and handle are not deemed to be pertinent to the present invention so that reference may be made to the commonly assigned patent application Ser. No. 508,208 for disclosure of additional non-essential subject matter.

For purposes of mounting the valve to a mounting surface, a mounting and retaining means generally designated 100 is advantageously provided. The details of this means are incorporated hereinto as non-essential subject matter from the commonly assigned patent application Ser. No. 508,208.

In the subject invention, there is also provided a plug-like stop or tube retention member generally designated 120 in the FIGURES. With particular reference to FIGS. 2, 3 and 4, this member will be seen as having an elongated shank portion 122 and a head portion 124. Shank portion 122 is dimensioned to be closely received in passageway 20 from outlet end 18 in a frictional fit created between the shank and the passageway. End or cap portion has a cross-sectional dimension at least slightly greater than the diameter of second portion 26 of first passageway 20 in order that the stop or tube retention member may be positively located insofar as longitudinal insertion of shank 122 into the first passage is concerned. As will be particularly noted from FIG. 4, end or cap portion 124 is angularly disposed relative to the longitudinal axis of shank 122. This angular disposition is the same as the angular disposition of front face 50 of outlet end 18 on the valve body in order that the top or cap will fit flush thereagainst when stop or tube retention member 120 is inserted into first passageway 20.

In addition, the innermost end of shank 122 includes a tube engaging end face 126 which is best shown in FIGS. 2 and 4. As with end or cap portion 124, end face 126 is also angularly disposed relative to the longitudinal axis of shank 122 and is preferably angled at the same angle as innermost end wall 56 of aperture 54. The reasons for this preference will be described in detail hereinbelow. It is also possible and although unnecessary to successful operation of the subject invention, to give tube engaging end face 126 a slightly concave configuration into shank 122 in order to provide a more positive receiving, retaining or bending area for the pinch tube associated with the valve.

As will be particularly noted from FIG. 2 when member 120 is inserted into passsageway 20, the length of shank 122 is such that the distance between end face 126 and inner end wall 56 of the tube receiving aperture is approximately equal to or slightly greater than the diameter of the pinch tubes to be associated with the valve. The reason for this preferred relationship is that if the distance is less than the diameter of the pinch tube, undesired kinking or restrictions may be placed in the tube which will affect liquid flow therethrough. Likewise, it is not particularly desirable to have the distance much greater than the diameter of the tube since the outermost end of the tube would not then be retained in a substantially positive position for dispensing purposes.

Stop or tube retention member 120 is preferably molded from a resilient plastic or the like for simple and economic manufacture. Additionally, different colored plastic material can conveniently be employed to provide color coding for when a number of the valves are to be employed in controlling liquid flow of plurality of different liquids. Similarly, other identifying indicia could be conveniently included on, for example, end or cap portion 124 for this same purpose. Likewise, number 120 may also be manufactured from any number of other materials.

FIGS. 5 and 6 show a slight modification of the stop or tube retention member. In these FIGURES, like components are identified with like numerals and include a prime (') suffix while new components are designated by new numerals. Accordingly, in FIGS. 5 and 6, member 120' includes a plurality of longitudinally disposed, outwardly extending ribs 128 along the outer surface of shank 122'. Thus, in this embodiment, the diameter of shank 122' is slightly less than the diameter of shank 122 shown in FIGS. 2 and 4 and ribs 128 act to frictionally engage second portion 26 of first passageway 20 when member 120' is inserted thereinto. The advantages of this alternative design is that when member 120' is constructed from a resilient plastic or the like, rigs 128 act as frictional engaging means so that it is not necessary to maintain quite the same precise standard of dimensional control required when using stop or tube retention member 120. Ribs 128 are resilient and will "give" somewhat if member 120' is slightly oversized.

In a typical and merely exemplary use environment contemplated for the subject valve, attention is invited to FIG. 1 which shows a liquid chiller C. Chiller C includes side and bottom walls 140, 142 respectively with each wall having thin inner wall 144 and a thin outer wall 146 with a conventional heat insulative material 148 disposed therebetween. The specifics of the chiller construction do not form a part of the present invention and are, therefore, not described in greater detail herein. As in the commonly assigned patent application Ser. No. 508,208 from which non-essential subject matter is incorporated hereinto by reference, a valve of the subject invention may be used in any number of liquid system dispensing environments employing other types of liquid containers or arrangements which include elongated pinch tubes for dispensing purposes.

In the specific environment in which the subject new and improved valve is being described, chiller C acts as a liquid container housing. It is contemplated that wine or other liquid will be placed in multi-ply plastic bags generally designated 150 in FIG. 1. Affixed to and extending outwardly from the lowermost portion of the bag is an elongated pinch tube 152. Although the tube could be manufactured from a number of materials, a resilient plastic tube is deemed to be particularly desirable. Although the length of the tube may vary, it is contemplated that it will be longer than required to extend from the chiller outwardly through the valve in order that it may be trimmed to the length required for a particular installation. Likewise, the outside diameter of pinch tube 152 may vary; however, it should be understood that this outside diameter is to be at least slightly smaller than the diameter of second portion 26 of first passageway 20.

In using the subject new and improved valve, bag 150 with its liquid contents is placed into chiller C and the pinch tube inserted into the valve body so as to pass along first passageway 20 and longitudinally outward therefrom at outlet end 18 as is shown in FIG. 4. The outermost end of the pinch tube may, of course, be initially sealed or otherwise closed during this procedure to prevent undesired premature liquid flow therefrom. Also, a valve handle 90 must be moved in either direction $a$ or $b$ to move end 76 of stem 74 from the first or closed position into a second or opened position withdrawn from full insertion into the first passageway.

Once the tube has been threaded through passageway 20, it may then be pulled arcuately in direction $c$ of FIG. 4 along apertured area 54 until the tube engages end wall 56 whereupon stop or tube retention member 120 is next fully inserted into passageway 20 from outlet end 18 as best shown in FIGS. 2 and 3. Once member 120 has been so inserted and because of both the dimensional and angular configurations discussed above, end face 126 of member 120 acts to retain pinch tube 150 in a desired position with the outermost end thereof angularly disposed of first passageway 120. Since the stop member is frictionally received within the passageway, the pinch tube will be retained in position until the stop or tube retention member is removed from the passageway.

As best seen in FIGS. 2 and 4, end wall 56 of aperture 54 is generally parallel to mounting and locating flange 40. It is contemplated that in the preferred normal usage, the valve will be mounted to an approximately vertically disposed surface so that the outermost end of the pinch tube will also be vertically disposed. By this arrangement, liquid issuing from the outlet end of the pinch tube as the valve is opened will not stream or arc outwardly thereof and will, instead, take a substantially vertical path from the tube for easy and precise filling of a container, glass or the like. Thus, the difficulties of having to judge or approximate a liquid flow path which normally has had the undesirable results of liquid loss due to inadvertent spillage with attendant housekeeping problems have been overcome.

When the liquid contents of container 150 have been disposed, it is merely necessary to reverse the order of the steps just described, remove the empty container and replace it with a new filled container. If a different type of liquid is to be dispensed through the valve, the color coding of or other identifying indicia on member 120 may be conveniently changed. Since the valve does not come into contact with the liquid being dispensed, there is no contamination of the valve by the liquid so that changes in the liquid being handled by any particular valve are made quite easy in that no flushing or other decontamination process is required.

It should also again be pointed out that the concepts of the subject invention may be employed when it is desired to position the pinch tube valve at any particular angle relative to a liquid container and that the angular disposition shown in the FIGURES is not to be considered as a limiting factor. It is considered to be of value, however, that end wall 56 and end face 126 are parallel to each other when member 120 is fully inserted into passageway 20 and that the distance between these two surfaces is approximately equal to or slightly greater than the diameter of pinch tubes operatively associated with the valve.

The use of apertured area 54 hereinabove described as well as stop or tube retention member 120 are deemed of value in reducing the overall cost of manufacturing the valves and rendering the valves useful in an environment where a plurality of identical valves are employed for dispensing different types of liquids. The concepts of the subject invention are not limited to applications in the specific liquid dispensing environment described and it should be understood that the invention is readily adapted to use in any number of liquid dispensing environments and pinch tube type containers or arrangements.

The invention has been described with reference to the preferred embodiment. Obviously, modifications and alterations will occur to others upon the reading and understanding of the specification. It is my intention to include all such modifications and alterations insofar as they come within the scope of the appended claims or the equivalents thereof.

Having thus described my invention, I now claim:

1. A pinch tube type valve for use in selectively controlling liquid flow through a flexible tube wherein the valve includes a valve body having an inlet end, an outlet end, a passageway connecting said inlet and outlet ends, an upper surface and a lower surface with said flexible tube adapted to be passed through said passageway with the outermost end thereof disposed adjacent said valve body outlet end, said pinch tube valve further including separate means communicating with said passageway for selectively closing said flexible tube to control liquid flow therethrough, the improvement comprising:

tube receiving means comprising an apertured area in the lower surface of said valve body adjacent said outlet end extending generally longitudinally along a portion of said lower surface from said outlet end toward said inlet end for receiving the outermost end of said tube in a particular desired position angularly disposed of said passageway for dispensing liquid therefrom; and, a stop member selectively receivable in said passageway from said outlet end, said stop member including a shank portion adapted to extend inwardly through a portion of said passageway from said outlet end to retain said outermost end of said flexible tube in said angularly disposed position, said stop member shank portion being dimensioned to extend into said passageway a distance less than the longitudinal extension of said aperture along said lower surface from said outlet end.

2. The improvement as defined in claim 1 wherein said stop member shank includes an end face, said end face adapted to engage said tube when said tube is passed through said aperture for retention in a desired position.

3. The improvement as defined in claim 1 wherein said apertured area comprises an elongated slot having a width approximately equal to the outside diameter of said tube.

4. The improvement as defined in claim 1 wherein said stop member includes means for frictionally retaining said member in said passageway.

5. The improvement as defined in claim 4 wherein said stop member further includes means for positively locating said member in said passageway.

6. A pinch tube type valve adapted to receive an elongated flexible tube for selective control of liquid through said tube, said valve comprising:
a valve body having upper and lower surfaces, an inlet end, an outlet end, a first passageway interconnecting said inlet and outlet ends and a second passageway communicating with said first passageway between said ends;
means for closing said valve disposed in said second passageway, said closing means being selectively movable within said second passageway into and out of engagement with the flexible tube in said first passageway for opening and closing said tube;
tube receiving means comprising an apertured area in the lower surface of said valve body adjacent said outlet end and extending generally longitudinally along a portion of said lower surface from said outlet end toward said inlet end for receiving the outermost end of said tube in a particular desired position angularly disposed of said first passageway for dispensing liquid therefrom; and,
a stop member selectively receivable in said first passageway from said outlet end, said stop member including a shank portion adapted to extend inwardly through a portion of said first passageway from said outlet end for retaining said outermost end of said flexible tube in said angularly disposed position, said stop member shank portion being dimensioned to extend into said first passageway a distance less than the longitudinal extension of said apertured area along the lower surface of said first passageway from said outlet end.

7. The valve as defined in claim 6 wherein said stop member shank includes an end face, said end face adapted to engage said tube when said tube is passed through said aperture for retaining said tube in said desired position.

8. The valve as defined in claim 7 wherein said aperture and shank are dimensioned such that the distance between the end wall of said apertured area spaced toward said inlet end and said end face is approximately equal to the outside diameter of said tube.

9. The valve as defined in claim 8 wherein said end wall and said end face are generally parallel to each other.

10. The valve as defined in claim 8 wherein said end wall is angularly disposed through said valve body lower surface from the outside thereof toward said inlet end.

11. A pinch tube type valve for use in selectively controlling liquid flow through a flexible tube wherein the valve includes a valve body having an inlet end, an outlet end, a passageway connecting said inlet and outlet ends, an upper surface and a lower surface with said flexible tube adapted to be passed through said passageway with the outer end thereof disposed adjacent said valve body outlet end, the improvement comprising:
an apertured area in the lower surface of said valve body adjacent said outlet end extending generally longitudinally along a portion of said lower surface from said outlet end toward said inlet end for receiving the outermost end of said tube in a particular desired position angularly disposed of said passageway for dispensing liquid therefrom; and,
a stop member having an end face and a shank portion wherein said shank portion is selectively receivable in said passageway from said outlet end, said shank portion having a length such that the distance between the end wall of said aperture spaced toward said inlet end and said end face is approximately equal to the outside diameter of said tube, said end face adapted to engage said tube for retaining it in said angularly disposed position.

12. The improvement as defined in claim 11 wherein said end wall and said end face are generally parallel to each other.

13. The improvement as defined in claim 11 wherein said end wall is angularly disposed through said valve body lower surface from the outside surface thereof toward said inlet end.

* * * * *